March 1, 1932.  M. E. CHURCH  1,847,815
EDUCATIONAL DEVICE
Filed Dec. 16, 1927  3 Sheets-Sheet 1
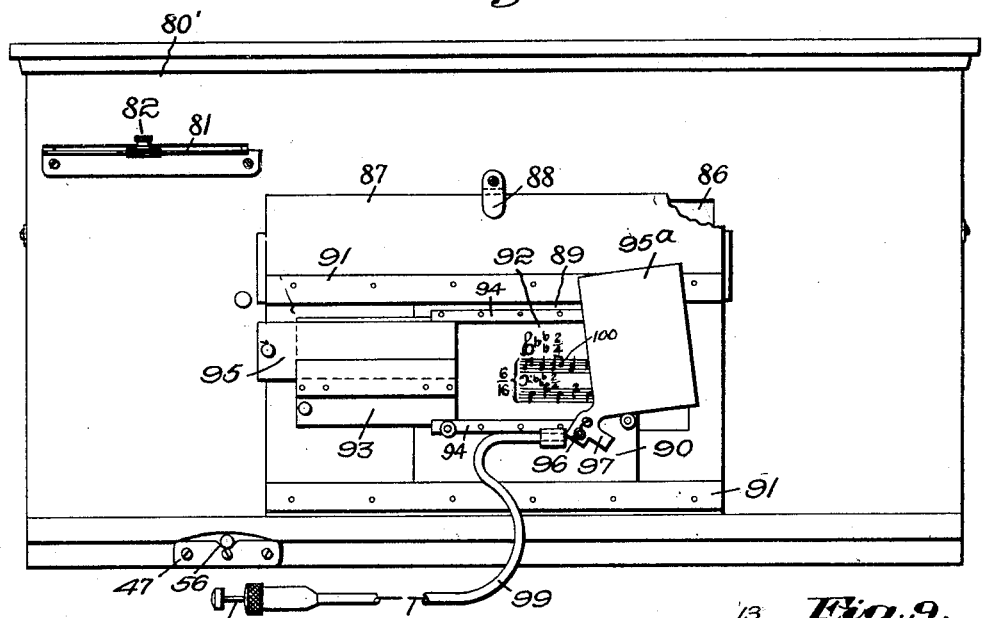
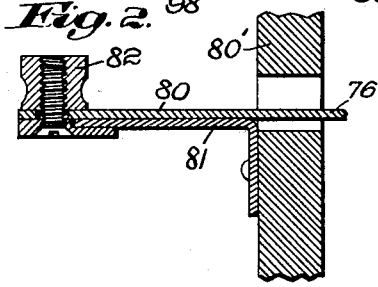
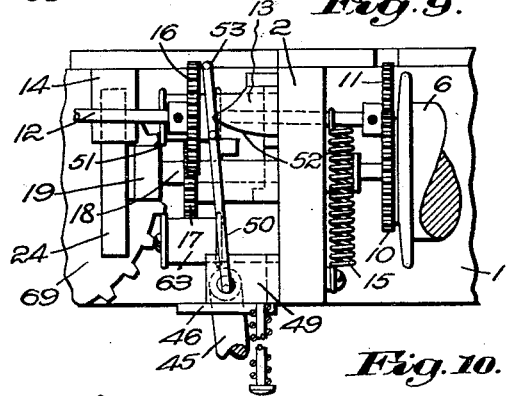
Inventor:
Mary E. Church, March 1, 1932.  M. E. CHURCH  1,847,815
EDUCATIONAL DEVICE
Filed Dec. 16, 1927   3 Sheets-Sheet 2
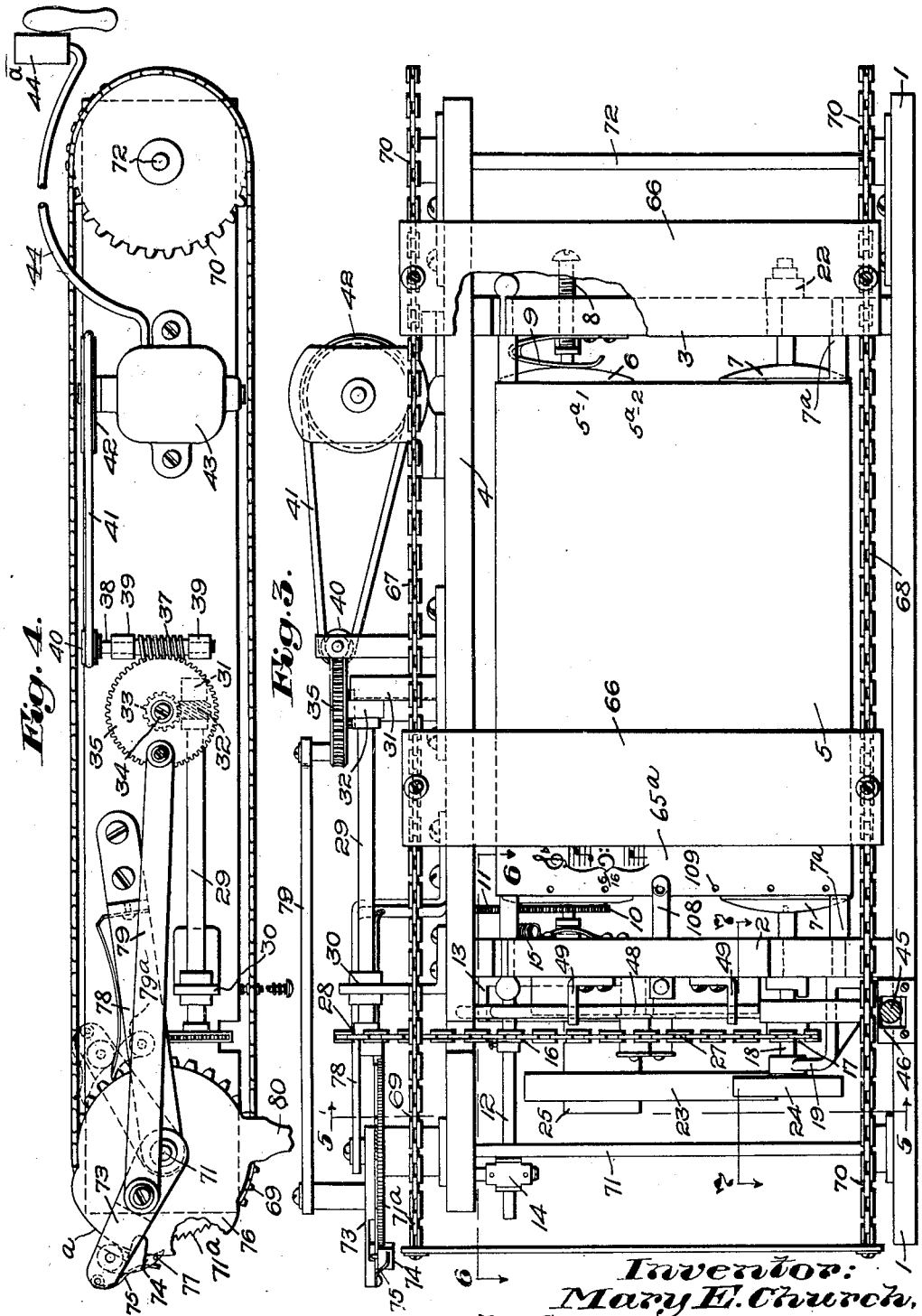
Inventor:
Mary E. Church March 1, 1932.                M. E. CHURCH                1,847,815
                            EDUCATIONAL DEVICE
                         Filed Dec. 16, 1927      3 Sheets-Sheet 3
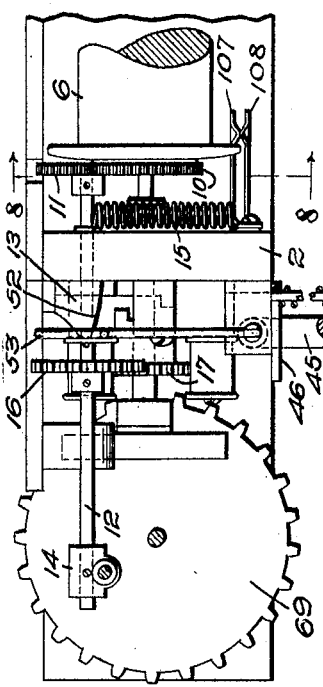
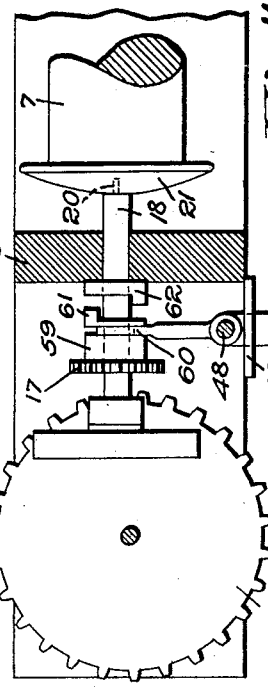
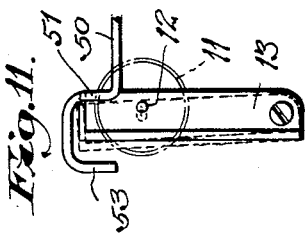
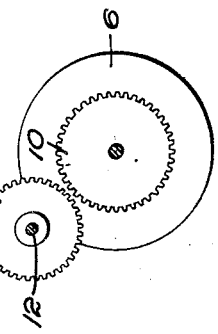
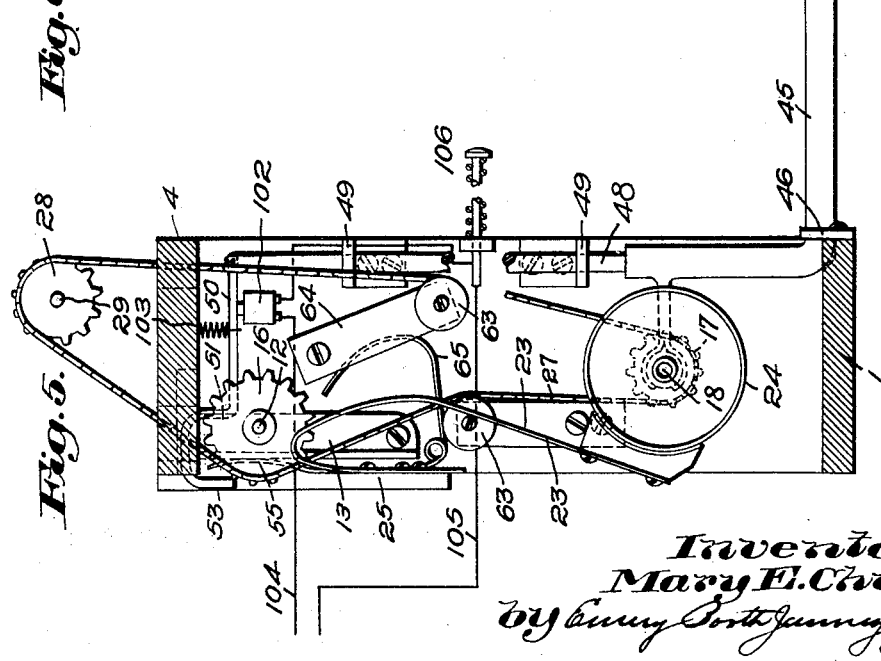
Inventor:
Mary E. Church,
by Curry Potts Janney Vamry
Attys.

Patented Mar. 1, 1932

1,847,815

UNITED STATES PATENT OFFICE

MARY E. CHURCH, OF CAMBRIDGE, MASSACHUSETTS

EDUCATIONAL DEVICE

Application filed December 16, 1927. Serial No. 240,459.

My invention relates to educational devices generally and more particularly to devices of that class designed to develop and cultivate the natural faculties and mental powers that enable one to quickly and accurately perceive and comprehend symbols of any sort and the meaning thereof, if any, and to act thereon. This object my invention is designed to accomplish by first exhibiting to the student a proper portion of text or symbols as arranged, and by next obscuring it, and then requiring immediate action on the part of the student to indicate how much of the disclosed text or symbols he comprehended. This mental activity thus aroused may of course be directed to the accomplishment of various results. It should be understood that this activity may proceed uninterruptedly as in continuous reading, or with such pauses as the user desires.

In the drawings of one embodiment of my invention described and illustrated herein, Fig. 1 is a front elevation of the device;

Fig. 2, a vertical sectional detail of the locking means for the speed control of the blind;

Fig. 3, a front elevation of the mechanism removed from the case;

Fig. 4, a plan of the same;

Fig. 5, a vertical section on the line 5—5, Fig. 3;

Fig. 6, a partial horizontal section on the line 6—6, Fig. 3;

Fig. 7, a similar figure on the line 7—7, Fig. 3;

Fig. 8, a vertical sectional detail of the gear mechanism for the upper roll on the line 8—8, Fig. 6;

Fig. 9, a view like Fig. 6, on the line 6—6, showing certain parts in a different position;

Fig. 10, a view like Fig. 7, on the line 7—7, showing certain parts in a different position;

Fig. 11 is a detail side view of the adjustable bearing for one of the roll actuating gears.

Referring first to Fig. 3 of the drawings, my novel construction comprises a base 1 from which rise two posts or supports 2, 3, which, in turn, carry a top bar 4. In the posts 2, 3, are mounted rotatable rolls 6, 7, for carrying a sheet of paper or other suitable material 5 bearing the characters or symbols that are to be exposed or disclosed to the student, and to be hereinafter described, and also carrying any suitable signs as numerals $5^a$ on its side edge to identify the several lines of symbols and also to indicate how far the sheet has been rolled up.

A natural process of the mind is for the eye to act ahead of interest or to prospect in advance of comprehension, and performance if any. Hence, as stated, my invention provides means for exposing to the student for comprehension, a proper portion of text or symbols for a suitable length of time, and for then obscuring it, thus urging the eye ahead; it being understood that the student continues his effort at unbroken silent comprehension, audible utterance, performance, or recording, as it may be, and allows himself to be thus urged, the observations proceeding consecutively so that the mental process may be regular and continuous. Hence there is provision of rolls for the text bearing sheet, and in the present case, Fig. 3, the top roll 6 is journaled in any convenient manner in the posts 2, 3, one of the journals or bearings 8, as a screw, in this case at the right hand end, being removable to permit of removing the roll when desired. The roll 6 is provided on one end, herein the right hand, with a tension spring 9 on the post 3, which bears on the roll end and restrains it from uncontrolled rotation. This roll, Figs. 6, 8, 9, is also provided with a gear 10 on its herein left hand end in mesh with a second gear 11 on a shaft 12, Figs. 3, 5, 6, 9, journaled in an elongated bearing 13, Fig. 11, pivoted to the post 2 and a depending bracket or hanger 14, Figs. 3, 6, on the top bar 4 near the shaft end. The journals for this shaft 12 are such as permit slight forward and backward adjustment of the shaft for a purpose to be presently explained. The gears 10 and 11, Figs. 6, 9, are normally held in mesh by a coil spring 15 which is attached at one end to the post 2 and at the opposite end to the shaft 12.

Movement is imparted to the rolls, see Figs. 3, 5, 6, 9, by a sprocket 16 on the shaft 12 and a similar element 17 on a short shaft 18 mounted in a bracket 19, Fig. 3, on the post 2, adjacent the end of the roll 7. The shaft 18, Figs. 3, 7, 10, has any suitable engagement as by a key 20, with the end 21 of the roll 7, while the opposite roll end is yieldingly held in the journal 22, so that the roll may be removed at will by sliding it slightly to the right. Uniform rotation of the roll 7, Fig. 5, when detached from its driving member is secured by means of a leaf spring 23 bearing on a balance wheel 24 on the end of the shaft 18, the spring being supported from the post 2 through a bracket 25.

Motion is imparted to the sprockets 16, 17, Figs. 3, 5, by means of a sprocket chain 27 on a sprocket 28 on the shaft 29 journaled in posts 30, 31, on the top bar 4. The shaft 29, Fig. 4, dotted lines, carries at its opposite or inner end a pinion 32 in mesh with a pinion 33, on a short shaft 34 on the top bar 4, said shaft carrying at its upper end a gear 35 meshing with a worm 37 on a shaft 38 in posts 39 on the bar 4.

The shaft 38 carries at its inner or, Fig. 4, upper end, a small pulley 40 over which runs a belt 41 from a pulley 42 on a motor 43 on the bar 4, which is supplied with current from any convenient source, not shown, the connection 44 with the current source including a rheostat 44$^a$ with a foot pedal for controlling the speed of the motor and various elements, some of which are yet to be described.

Rotation of the rolls 6, 7, Figs. 3, 5, 6, 7, to wind the sheet 5 from the latter upwardly to and on the former roll so that the text thereon is presented consecutively and in usual sequence, and rotation of the rolls and rewinding of the sheet in the opposite direction, as the operator may elect, is controlled, Figs. 3, 5, 10, by means of a clutch 58 having a handle 45 in the plate 46 and slidable on a bar 47, Fig. 1, on the case edge, the handle being on the lower end of an upright switch bar 48 supported in brackets 49, Fig. 3, the upper end of the bar having an inwardly turned and pivoted section 50 and then an upwardly turned section 51 to bear, Fig. 6, against a bevel face 52 on the bearing 13 already referred to, pivoted to the post 1, for vertical forward and back swinging movement, the bar 48 being again turned downwardly, Fig. 6, behind the member 52 as at 53.

When, Fig. 9, the handle 45 is turned to the right, the upwardly turned end 51 of the bar 48, is at the low point on the bevel 52, permitting a spring 55, Fig. 5, on the back of the casing, to thrust the bearing 13 forward, and cause the gear 11 to mesh with the gear 10 to rotate the roll 6 to wind thereon the sheet 5 from the roll 7.

When the handle 45 is in the position shown in Figs. 1, 3, 6, and, Fig. 7, in the slot 56 or central position of bar 47, on the front edge of the case, the bearing 13 is thrust backwardly by the part 51, withdrawing, Fig. 8, the gear 11 from mesh with gear 10, and both the rolls 6, 7 will be thereby disconnected from the operating mechanism.

On the shaft 18, Figs. 7, 10, on which is mounted the roll 7, is a grooved collar 59 which receives a pin 60, on the rear face of the clutch bar 48 already referred to, and this collar has projecting laterally from it an ear or pin 61 adapted to engage a corresponding member 62 on the shaft 18 forming a clutch 58, already referred to, to give rotation thereto when the two members 61 and 62 are brought into engagement by sliding the collar 59 to the right on the shaft 18. This sliding of the collar is attained by means of the handle 45 which then, Fig. 10, would be in the position at the left hand end of the plate 46. In this position of the handle the sheet 5 will be wound from roll 6 onto roll 7.

The chain 27, Fig. 5, runs over pulleys 63 on the post 2 and the pivoted block 64 respectively, the block 64, also being on the post 2, and this block is maintained under necessary tension respecting the chain 27 by means of a spring 65 bearing against the block 64 and seated on the back of the case.

It is intended that the extent of the portion of the text on the sheet to be exposed and the rapidity of the exposure may be controlled, if desired, and regulated by the operator at will so that the whole effort on behalf of the student may be in accordance with his ability, disposition, temperament, etc., as the purpose is to normally and gently develop the powers of the individual and not in any way to force him. To that end, Fig. 3, the symbols 65$^a$ on the sheet 5 are adapted to be displayed to the student by a novel construction which includes, among other elements, one or more traveling blinds 66 carried by suitable elements as chains 67, 68, the former, Figs. 3, 4, 6, being carried by sprockets 69, 70 on shafts 71, 72 mounted in the upper bar 4 and base 1.

The shaft 71, Figs. 3, 4, extends above the sprocket 69 and has thereon a ratchet wheel 71$^a$ and above it a depending pawl carrying arm 73 with a pawl 74 thereon having a spring 75 to maintain it normally in contact with the ratchet wheel 71$^a$, and a pawl controlling member 76 in the shape of a cam shaped disk movable about the shaft 71, whereby the cam portion of the disk edge may be caused, by proper adjustment of the handle 80, to engage an upstanding pin 77 on the pawl 74, and by throwing it outwardly release it from engagement with the ratchet, the edge of the disk, at the desired point, by its position, thus controlling the extent of the feeding action of the pawl and travel of the blind which is effected by the wheel 35 through the link 79 and arm 73 to which it is connected. The ratchet 71ª may be provided with as many teeth as desired, for instance sixteen to the inch. The upper end of the shaft 71, Fig. 4, is supported in an overlying bracket 78 on the bar 4 and reverse movement of the ratchet 71ª is prevented by the pawl 79ª on the rod 78.

The disk 76, Figs. 1, 2, 4, is manually adjustable about the shaft 71 to control the action of the pawl 74, by means of a handle 80 which extends outward through the front wall 80′ of the case and may be locked in adjusted position on a projecting plate 81 by the clamping screw 82. When the handle is at the extreme left hand end of its throw, the disk 76 with the cam face edge is so positioned relative to the pawl 74 that the cam will prevent the pawl from engaging the teeth of the ratchet 71ª at all, but as the handle 80 is turned to the right as in Fig. 4, the action of the cam edge thereof upon the pawl 74 is restricted so that the pawl will engage the ratchet 71ª at the beginning of its stroke, as shown in dotted line, Fig. 4, and will rotate the ratchet 71ª until the pin 77 engages the cam edge on the pawl 74, and throws the pawl outwardly sufficiently far to disengage it from the teeth of the ratchet and through the rest of its stroke, as shown in Fig. 4, the pawl will ride upon the cam edge and will not rotate the ratchet. In the position of the cam disk shown in Fig. 4, the pawl 74 will engage the ratchet from the beginning of its extreme right hand position, as shown in dotted lines, until it is engaged by the cam a, a distance something less than one quarter of the circumference of the ratchet.

Having described the means for feeding the sheet or roll bearing the symbols upwardly, the means for rewinding the sheet in the opposite direction, and means for exposing at intervals or continuously portions of the text or symbols, I will now proceed to describe the means provided for presenting detached symbols or portions of the text on the sheet to the eye to such extent and at such speed as may be desired.

In the present instance, the means comprises a plurality of slides in the front wall, and a shutter, and means for quickly opening and closing it at will.

In the front wall 80′ of the case there is a rectangular window 86 which is closed by a plate 87 of suitable material as aluminum, held in position by any convenient means as a button 88. This plate in turn is provided with a window 89 which may be partly closed by a slide 90 movable behind longitudinal cleats 91, leaving a part of the window at the right of the slide, open so that the operator can tell by the signs 5ª on the sheet as seen through the window how far the sheet has moved. This slide furthermore has an opening 92 which may be partly closed from left to right by the slide 93, beneath cleats 94 on the slide 90, and which carries a slide 95 for reducing the size of the window 92 between the cleats 94 when desired. Furthermore, a pivoted shutter 95ª is provided on the slide 90, which shutter may be operated to open or close the opening 92 in slide 90 to expose and then obscure the symbols referred to on the sheet 5 by means of any convenient device as a wire 96 connected at one end to the ear 97 on the shutter, while the other end is provided with a handle 98 for manipulating it through the flexible wire tubing 99. If it is found that the student is unable to compass the whole process of prospecting ahead and comprehending the related text or symbols, the invention is intended to provide means for exposing to him only certain detached portions of text or symbols of varying extent and varying degrees of difficulty, for varying lengths of time, as stated, as the sheet 5 is gradually fed upward to roll 6 so that the student may first become proficient in the single operation of merely grasping an unrelated portion of text.

Some of the results to be accomplished by the mental activity aroused as above described may be:

1. Disciplining of the mind to grasp at one time several or many items, details, related or otherwise;

2. To train the mind to retain ideas for future use, i. e., to train the memory; and 3. Enable the mind accurately, smoothly and ultimately with requisite speed to execute the mental act or acts suggested by the symbols, which result in the accomplishment of such achievements as reading, solving arithmetical and other problems, etc.: that is, aid the mind properly and without impediment to function in a natural way, which is for the eye to prospect in advance of comprehension and performance, as stated. To illustrate:— In fluently reading aloud, the eye is always in advance of the voice, and upon this depends all freedom in so reading.

This being the case, my invention endeavors by a novel construction to aid those to become able to properly think thus who do not as yet do so and who are impeded and distressed by their inability.

As already stated, the text bearing sheet 5 may be provided with such text or symbols as it is desired to use. Further, the symbols need not be continuous in arrangement, but may be detached individually or otherwise, as the device is provided with means for showing the symbols so arranged.

In use, the sheet 5 bearing the required symbols having been provided for roll 7, the free end of the sheet is attached to roll 6 by any convenient and conventional means, not shown. The slide 87 is preferably removed from the front wall 80′. The handle 80 of the ratchet disk is then thrown to the extreme left position to prevent operation of the ratchet and the handle 45 of the sheet feeding switch control is moved to its extreme right hand position, Fig. 9, to allow the spring 55 to throw the bearing 52 forward to cause gear 10 to mesh with gear 11 and the motor 43 is then started and the sheet 5 rolled up on the roll 6 until the desired line of related text symbols or detached symbols is reached. The handle 45 is then placed in its central position, Fig. 6, to prevent further rotation of the rolls 6, 7. Then the handle 80 of the ratchet control is moved to the right to such point as will permit the ratchet disk to cause the pawl 74 to throw the ratchet 71 the proper distance to feed the blind 66 forward a distance equal to the beat length of the, in this case, measured music text, i. e., 6/16 of an inch. The necessary adjustment of the handle 80 may be ascertained by figures, not shown, on the plate 81 supporting the handle, and over which the handle moves.

When the student has finished with one line, the sheet may be moved to bring the next line into position in the window 86 by repeating the steps already recited for bringing the first line in position.

If the instructor desires to use any detached and unrelated symbols, without the use of the blind 66, the plate 87 is restored to its position over the window 86, the slides 93, 95 moved to the left, Fig. 1, and the shutter 95ª actuated to close and then open the window 92 at the desired times and thus obscure and then expose the symbols at will.

The width and height of the window 92 may be reduced by moving the slides 93, 95 to the right, Fig. 1. When using the shutter as just described, manual adjustment of the window 92 with respect to the succeeding symbols on the same sheet line may be effected by moving the slide 87 bodily to the right over the window 86 beneath the button 88.

After the sheet 5 has been wound up entirely or to the desired extent on roll 6, it may be rewound on roll 7 by throwing the handle 45 to the extreme left hand position, Fig. 10, to cause clutch 59 to engage roll shaft 18 either with or without stopping the travel of the blinds by handle 80 as desired.

While the means already described for feeding the paper upward and rolling it on roll 6 is entirely practicable and satisfactory when a substantial part of the paper is to be rolled, I have provided an additional means for feeding the paper upward through a step by step motion when it is desired to proceed from one line to the next and more accurate feeding motion is desired.

To that end, I have, Fig. 5, pivoted the inwardly turned end of the bar 50 to the upright section and provided an electro-magnet 102 on the post 2 which, when energized, acts normally to hold the inwardly turned section 50 down in the full line position shown in Fig. 5. An opposing spring 103 tends to draw the bar 50 upwardly out of contact with the member 13 when the magnet 102 is deenergized and thus permit the spring 15 to draw the gear 11 into mesh with the gear 10 to rotate the roll 6.

The magnet 102, Fig. 5, is in an electric circuit comprising the line 104 from a source of current, as a wall socket, not shown, and the line 105 in which is a push button 106 normally closing the line and, Fig. 6, a brush 107 on the post 2 and lying beneath the paper 5.

Directly beside this brush, Fig. 6, is a second brush 108 in the line to the socket already referred to. The paper is provided with apertures 109 along one edge which, when they pass the brushes 107, 108 allows the brushes to meet and close the circuit.

Referring now to Fig. 1, after the student has finished with line one, the handle 45 is turned to neutral position, Fig. 6, and the motor started by the rheostat rotating the gear 11. The button 106 is depressed, opening the circuit through line 105, deenergizing magnet 102 and permitting the spring 103 to draw the bar 50 upward away from its contact with bearing 13 and thus permit spring 15 Fig. 11, to draw the bearing and shaft 12 forward and throw the gear 10 into mesh with gear 11 to rotate the roll 6, the button 106 is then allowed to automatically close the circuit. The roll 6 rotates until one of the apertures 109 passes between the brushes 107, 108 permitting them to contact, when the circuit is again completed, the magnet energized and the member 50 again drawn downward against member 13, Fig. 11, throwing the latter rearwardly and withdrawing gear 10 from engagement with gear 11 and stopping the roll 6. These apertures 109 are preferably placed horizontally in line with the text on the roll 5 so that the roll may be stopped to present the selected line of the text.

My invention is not limited to the precise embodiment thereof described and illustrated herein, but is more particularly pointed out in the following claims:

1. An educational device comprising a case, rolls therein carrying a sheet of material having thereon a series of music symbols; a window with a pivoted shutter and operating means therefor exposing some of the symbols to the observer, and means including a source of power and connections between it and the rolls to rotate the rolls unwind the sheet and to present further symbols as former symbols displayed pass out of sight, and to rewind the sheet in the opposite direction; and means including a blind and connections between it and the source of power for imparting measured motion to the blind to obscure the symbols presented.

2. An educational device comprising a case, members therein carrying a sheet of material having thereon music text; a window exposing the text to the observer, and means to rotate the rolls at uniform speed intermittently in either direction to present further text as the former text displayed passes out of sight.

3. An educational device comprising a case, rolls therein carrying a sheet of material having thereon music text; a window exposing the symbols to the observer, means to rotate the rolls to unwind the sheet and present further text as the former text displayed passes out of sight, means also to wind the sheet in the opposite direction; and a traveling blind acting to obscure the symbols in sequence, and means to adjust the extent of travel of the traveling blind and thus vary the quantity of symbols obscured following the period of exposure.

4. An educational device comprising a case, rolls therein carrying a sheet of material bearing music text; a window having sectional sliding shutters, and a pivoted shutter exposing the text to the observer; means to rotate the rolls to unwind the sheet and present further text as the former text displayed passes out of sight and means also to unwind and wind the sheet in the opposite direction; and controllable traveling means acting to obscure the text in sequence at will and determine the period of exposure while the roll rotating means is at rest.

5. An educational device comprising a case, rolls therein carrying a sheet of material having thereon music text; a window exposing the symbols to the observer, and means to rotate the rolls to unwind the sheet and present other text and to rewind the sheet in the opposite direction; said means including a motor, a gear on one roll shaft, a cooperating gear in a movable bearing, a coupling on a second roll shaft, and a clutch handle for adjusting the position of the movable bearing, and also for coupling the second roll shaft to the operating means, to throw the rolls into operating relation therewith.

6. An educational device comprising a case, rolls therein carrying a sheet of material having thereon music text; a window exposing the text to the observer, and movable means acting to obscure the text in sequence, and roll rotating means to unwind the rolls and present other text; and means also to wind the sheet in the opposite direction including a gear on one roll end, a cooperating gear in a movable bearing having a cam face thereon, a spring acting to position said gears to mesh with each other; and a separable connection between the second roll member and its operating means; and a clutch handle acting to throw the cooperating gear and bearing away from the first named gear, and to throw the second roll member into operative relation with the operating means.

7. An educational device comprising a case, supports therein carrying a sheet of material having thereon music text; a window exposing the text to the observer; a traveling blind comprising flexible supporting members acting to obscure the text in sequence, rotating members for the flexible members, means for operating them, and adjustable means for fixing the period of obscuration acting by a step by step motion.

8. An educational device comprising a case, rolls therein carrying a sheet of material having thereon a series of symbols, a window exposing the symbols to the observer; traveling means acting periodically to obscure the symbols in sequence and thus to determine the period of exposure including a traveling blind, a flexible bling support; rotating members therefor, means for operating them, including a rotatable ratchet, a pawl acting therewith, and a cam shaped disk controlling the pawl action; and means for controlling the position of the disk to regulate the period of obscuration acting by a step by step movement of the blind.

9. An educational device comprising a case, rolls therein carrying a sheet of material having thereon music text; a window with a longitudinally movable slide and a hinged shutter exposing the text to the observer, and means including a source of power and connections between it and the rolls to rotate the rolls and unwind the sheet including an electromagnet in an electric circuit having brushes adapted to contact at appointed intervals through the sheet to close the circuit and stop the rolls, whereby to present further text as the former text displayed passes out of sight, and to rewind the sheet in the opposite direction.

10. An educational device comprising a case, rolls therein carrying a sheet of material having thereon text; a window exposing the text to the observer and means to rotate the rolls to unwind the sheet and present further text as the former text displayed passes out of sight and to rewind the sheet in the opposite direction; said means including a motor, a sprocket chain actuated thereby, a gear on one roll shaft, a cooperating gear therefor in an adjustable bearing, a wheel on the shaft in said bearing actuated by said chain, a driving connection on the second roll shaft, a driving wheel actuated by the chain therefor, and a clutch handle acting in one position to disengage said gears and coupling, and acting in a second position to permit engagement of said gears and unlock said driving connection to roll the sheet on the upper roll, and in a third position acting to disengage said gears and establish the driving connection to roll the sheet on the lower roll.

11. An educational device comprising a case, rolls therein carrying a sheet of material having thereon measured music text; a window exposing the text to the observer, and means to rotate the rolls to wind the sheet off from one roll and on to the second roll to present additional text as the text formerly displayed passes out of sight; said means including a motor, a gear on one roll shaft, a cooperating gear in a movable bearing, a coupling on a second roll shaft, and a clutch handle for adjusting the position of the movable bearing, and also for coupling the second roll shaft to the operating means, to throw the rolls into operating relation therewith.

12. An educational device comprising a case, rolls therein carrying a sheet of material having thereon measured text, and openings in the sheet to permit establishment of electric contact therethrough, means to rotate the rolls to unwind the sheet and present further text as the former text displayed passes out of sight including a motor, a gear on one roll shaft, a cooperating gear in a movable bearing; electric means for adjusting the bearing including an electromagnet, a member normally held thereby adjacent said bearing to hold it in one position, and a spring tending to draw the member away from said bearing when the magnet is deenergized; an electric switch therefor to control the action of said magnet manually, and brushes in an electric circuit including said magnet and adapted to be engaged by the sheet, the brushes acting to close the circuit through the opening in the sheet at predetermined times to stop rotation thereof.

13. An educational device comprising a frame, rolls thereon for carrying a sheet of material bearing music text to be displayed, rolls on the frame carrying flexible supports for the blinds, with blinds on the supports arranged to obscure part of the text; and means including a source of power and connections between it and both sets of rolls for operating them, including a gear, a ratchet disk, connections between them including a step by step pawl actuating link, and a cam on the disk determining the extent of action of the pawl to actuate the blind carrying rolls and the blinds; and connections between said pawl moving means and the sheet-bearing rolls including a clutch and a movable bearing and a lever controlling them for operating the rolls in both directions.

In testimony whereof, I have signed my name to this specification.

MARY E. CHURCH.

CERTIFICATE OF CORRECTION.

Patent No. 1,847,815.  Granted March 1, 1932, to

MARY E. CHURCH.

It is hereby certified that error appears in the printed specification of the above numbered patent requiring correction as follows: Page 1, line 89, before "Fig. 11" insert the words with a laterally turned top portion 13a having an inclined edge 52, Fig. 6, and; page 4, line 122, claim 1, after the word "rolls" second occurrence insert the word to, and line 123, same claim, strike out the word "to"; page 5, line 85, claim 8, for "bling" read blind; and that the said Letters Patent should be read with these corrections therein that the same may conform to the record of the case in the Patent Office.

Signed and sealed this 17th day of May, A. D. 1932.

(Seal)

M. J. Moore,
Acting Commissioner of Patents.